United States Patent [19]

Richards, Sr.

[11] Patent Number: 4,636,067
[45] Date of Patent: Jan. 13, 1987

[54] PHOTOGRAPHY PIN BOARD SYSTEM

[76] Inventor: Chester L. Richards, Sr., 1610 Sheridan Rd., Glendale, Calif. 91206

[21] Appl. No.: 824,208

[22] Filed: Jan. 30, 1986

[51] Int. Cl.$^4$ ............................................. G03B 27/20
[52] U.S. Cl. ........................................ 355/91; 355/73; 355/76; 355/79
[58] Field of Search .................... 355/73, 76, 79, 91, 355/92, 93, 94

[56] References Cited

U.S. PATENT DOCUMENTS

| | | | |
|---|---|---|---|
| 3,463,586 | 8/1969 | Carlson et al. | 355/76 |
| 3,634,009 | 1/1972 | Van Dusen | 355/73 |
| 3,771,870 | 11/1973 | Taylor | 355/76 |
| 4,284,349 | 8/1981 | Beasley et al. | 355/79 |
| 4,504,142 | 3/1985 | Richards | 355/92 |

Primary Examiner—Monroe H. Hayes
Attorney, Agent, or Firm—Marvin H. Kleinberg

[57] ABSTRACT

An improved pin board system for use within a vacuum contact frame includes a two piece pin board arrangement with an elastomeric gasket sheet. The primary pin board is relatively thin, but stiff, so that it can flex slightly in response to the force of the vacuum frame's pressure blanket. Alignment pins "float" slightly within oversized holes and are spring loaded against the pin board by means of the elastomeric backing. A vacuum port and manifold board, similar in material and thickness to the primary pin board provides a vacuum connection with the top surface of the pin board. An elastomeric gasket sheet, upon which the two boards of the assembly rest, provides a vacuum seal when the combination is pressed against a covering glass of a vacuum frame.

22 Claims, 3 Drawing Figures

PHOTOGRAPHY PIN BOARD SYSTEM

BACKGROUND OF THE INVENTION

The present invention relates to photographic printing and more particularly to an improved pin board alignment system for use with contact printing frames.

An earlier patent, U.S. Pat. No. 4,504,142, of the present inventor, describes an improved vacuum printing frame for making contact photographic prints. According to that invention, a system of inflatable bladders, connected to the blanket of the frame, pushes the mask/film sandwich against the glass top of the frame in a sequentially controlled manner. The advantage of that invention is that the air between the mask and the film is squeezed out with complete control leaving the film and mask in fully intimate contact. Furthermore, the bladder assembly can be constructed in such a way as to start the evacuation contact at the aligment pins and progressively move the contact across the mask/film sandwich.

The present invention was conceived to improve upon the existing methods of aligning the mask and film, in contact photographic printing, when precision registration between the two is required. It is particularly useful when used in conjunction with my improved vacuum printing frame, described in the earlier patent, because of the unique way the new invention takes advantage of the bladder air squeezing. The present invention will also work with conventional types of vacuum frames, including "glass down" vacuum frames.

Contact photographic printing, especially of color separations, often requires high precision alignment between the masks and the various pieces of sensitive film to be printed. The method commonly used in achieving this alignment is to punch holes in the mask and the film and place alignment pins through these holes. Two alignment pins are required for complete restriction of the relative position between the mask and the film.

There are two pin alignment techniques commonly in use. Both require a precision two-hole punch which is used to put identically spaced holes in both the mask and the film. The older alignment system uses a pin board with fixed pins spaced at the same distance as the punches in the precision, two-hole punch device. The punched film is laid down first on the fixed pin board. The mask is laid down on top of the film. The pins from the board pass through both the film and the mask to provide a reference for alignment. Additional registration holes and pins may be utilized for better control.

Once the photographic exposure is made and the film is developed, the film and mask may again be brought into precise alignment by placing both on the reference pin board. Moreover, all pieces of film which have been punched and aligned and exposed using this pin board will automatically be mutually aligned.

This traditional pin board arrangement has two significant technical difficulties. First, film expands and contracts, under thermal and humidity change, by a different amount than the expansion and contraction of the pin board. Thus, there are practical difficulties in maintaining mask/film alignment under conditions which are found in the normal working environment. Second, because the tops of the alignment pins project substantially above the top surface of the mask sheet, this type of pin board is not suitable for use with vacuum contact frames. The reason for this is that for contact printing the mask and photofilm must be pressed in firm contact with the lower surface of the glass top plate of the vacuum frame. The projecting pin ends of the traditional pin board prevent this intimate contact.

For these reasons, a second kind of pin alignment system, which uses floating pins, has been developed and is in common use with vacuum contact frames. In this system, the pin board acts only as a flat support for the mask/film sandwich. In place of fixed pins, holes are drilled through the board. The holes are somewhat larger in diameter than the alignment pins so that these pins float freely in the holes. The pins are inserted from the backside and are usually taped in place.

The pin used with this system is the standard, free pin which consists of a flat ended metal cylinder welded to a thin flat plate, which caps one end of the cylinder. The flat cap plate is about one inch square. In cross section the combination resembles an inverted "T". The flat plate permits the pin to be taped down onto any convenient flat surface.

In use, the film and mask sheets are punched with the same precision punch, which puts at least two alignment holes in each of the sheets. With pins pressed through the adjacent holes in the two sheets, each sheet of the mask/film sandwich acts as an alignment reference for the other, thereby obviating the need for the pin board to act as a position reference. Thus, the pins may float in the holes in the pin board. The advantage of this approach is that, since the mask and film are made of the same material, their expansion coefficients are the same and relative alignment is maintained over a wide range of environmental conditions.

Suppose an assembly of mask/film sandwich and floating pin board is placed in a vacuum frame. As the air is evacuated from the chamber of the vacuum frame, the board assembly is pressed firmly up against the top glass of the frame. The pins, which project up through the mask/film sandwich, press against the lower surface of the glass and are pushed down in retraction so that the flat top surfaces of the pins become flush with the top surface or the mask sheet. The mask/film sandwich is therefore able to press firmly into contact with the bottom of the vacuum frame's glass top plate. As a consequence of the pin retraction, the small metal plate joined to the bottom of the pin cylinder is pushed down into the flexible vacuum blanket which forms the bottom wall of the vacuum chamber of the vacuum frame.

The disadvantage of this commonly used type of floating pin board is that there is a substantial clumsiness which occurs when the board is used in a vacuum frame. This clumsiness occurs because the alignment pins are adhesively taped to the backside of the pin board. Each time the board assembly is used in the vacuum frame the adhesive holding tape is dislodged and the alignment pins are knocked loose. Thus, the pins must be retaped in place with each setup. This, it turns out, consumes substantial time. For this reason innovators in the graphic arts industry have been designing alternative types of pin boards.

The problem of achieving the necessary alignment stability, together with convenience of use, is not an easy one to solve. The best solution to reach the market place prior to the present invention is the Stoesser pin board. This device uses precision manufactured, telescoping pins, which consist of concentric cylinders that are spring loaded together. These "retracting" pins are permanently fastened into close tolerance wells which are precisely drilled into a thick pin board. This type of pin board is therefore similar to the first type of fixed pin board, but, because the pins can be retracted, the Stoesser board can be used with vacuum frames.

The Stoesser board has two substantial disadvantages. The first is that, because of the precision required during manufacturing, the board is expensive. The second is that the board is thick and therefore very rigid. It does not, therefore, take full advantage of the inflating bladder action of the quick pull up vacuum frame described by U.S. Pat. No. 4,504,142.

What is needed is a pin board which has some flexing capability so that as the bladders in the quick pull frame are inflated, the board conformally flexes to progressively squeeze out the air from the mask/film sandwich. The present invention solves these problems, as well as several others.

The basic solution for pin alignment results from adoption or the relative alignment, free floating pin system described above as the second basic type of pin board arrangement. One important, and non obvious, novelty introduced by this invention is the notion that the adhesive tape, which is normally used to hold the free pins to the back of the pin board, may be replaced by an elastic sheet material. The elastic sheet is bonded to the back side of a free floating type of pin board. However, the region or the elastic sheet immediately surrounding each of the pin holes is left free of bonding material. These "free regions" form pockets which contain the alignment pins. The pins are, as a result, free to "float" back and forth in the loose tolerance holes or apertures so that the mask and film can act as mutual alignment masters for each other.

The primary function of the elastic backing sheet is to act as a spring return device. A pin is permitted, by the elastic backing sheet, to yield to pressure on its top. The pin is forced downward and presses against and stretches the elastic sheet. When the pressure is released, the stretched elastic sheet provides a restoring force which causes the pin to move back into its original position. The result is that the floating pin acts as if it were spring loaded.

The elastic backing sheet yields to downward pressure on the pins in such a way that when the assembly is pressed against the glass top plate of the vacuum frame the pins are pressed down flush with the top surface of the mask sheet. In normal operation, the displacement of the pins in a downward direction is absorbed by the flexible nature of the vacuum blanket which forms the bottom wall of the vacuum chamber. In alternative embodiments, a thick, resilient backing elastic sheet could be used to absorb the downward motion of the pins entirely within its volume.

To help retain the pins in a vertical orientation, parallel to the axis of the aperture in the pin board, a metal plate that is larger than the pin cap plate is secured to the elastic sheet to underlie each pin. This backing plate enables proper orientation of the pin and enhances lateral movement of the pin with little or no frictional interference with the elastic sheet.

The top surface of the pin board is pebbled with a fine grain texture so that it may simultaneously provide a precision surface upon which the mask/film sandwich may rest and also provide channels for air to be evacuated from the space between the film and the pin board.

The preferred embodiment of the invention includes an auxiliary board which normally stays connected to the vacuum frame. This auxiliary board has a hole drilled through it which is connected to the vacuum outlet of the vacuum frame. Thus, all the air in the vacuum frame is compelled to pass through this hole in the vacuum port board when the frame is evacuated.

The vacuum port board normally is placed immediately along side the pin board next to the alignment pins. When the air is evacuated from the frame, both the vacuum port board and the pin board are pressed together against the top glass cover. The vacuum port board also has a pebble textured surface to help air to escape from the region between the top surface of the port and pin boards and the glass cover plate.

In addition, in the preferred embodiment, grooves are routed in the top surfaces of the vacuum port board and the pin board so as to provide channels for air passage. The grooves in the two boards are mated at the junction between the two boards in such a way that there is a clear air passage from the location of the pins in the pin board to the vacuum port in the port board.

The final element of the preferred embodiment of the improved pin board system is a sheet of gasket material. This sheet is substantially larger in size than the combination of the pin board and vacuum port board when the two boards are lying side by side. The excess material of the gasket sheet presses up against the glass cover plate around the edge of the two boards and provides a vacuum seal when air is evacuated through the vacuum port of the port board.

In an alternative embodiment, the gasket sheet, with pin board, assembly is used without requiring a vacuum port board. The gasket sheet has a vacuum communication hole. When the pin board is placed on the gasket sheet in such a way as to partially cover the vacuum communication hole in the gasket sheet, the hole cannot be sealed off around the edge of the pin board and there will be airflow from the top of the pin board down the edge of the pin board and into the vacuum communication hole in the gasket sheet. Thus, the gasket sheet is used with a removable pin board which does not have a vacuum port hole and which does not require a separate vacuum port board.

In other alternative embodiments of the invention the pin board may be used by itself in the vacuum frame, the pin board and vacuum port boards may be permanently joined to make a single board, or, either of these three board types may be used without a vacuum gasket sheet.

DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

In FIG. 1 there is shown a view of the complete assembly of all of the elements of the preferred embodiment of the improved pin board system. The system includes a pin board 10, an adjacently positioned vacuum port board 12 and a gasket sheet 14. Mounted on the pin board 10 by means of floating alignment pins 16, is the mask/photographic film sandwich 18. The vacuum port board 12 has a vacuum port hole 20 which is connected to the vacuum pump of the vacuum frame (not shown). In the improved system, all of the air from inside the vacuum frame is drawn out of the vacuum frame through this port hole 20.

Figure 1:
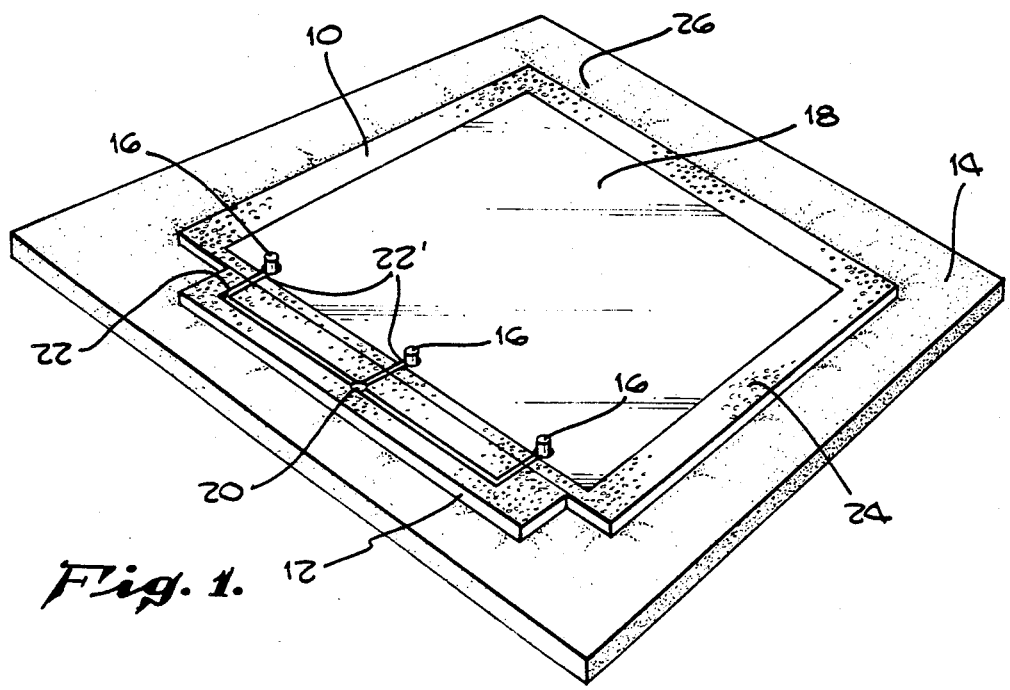
FIG. 1 is a perspective view of the major elements of the pin board system according to the present invention.

In addition to the vacuum port hole 20, the vacuum port board 12, in the preferred embodiment, also has a manifold of grooves 22 which are cut in its top surface. These grooves 22 provide low resistance air channels which lead from the port hole 20 to similar grooves 22', in the pin board 10. The similar grooves 22', in the pin board 10 lead to the vicinity of the alignment pins 16. The function of these grooves 22', is to evacuate air first from the location of the alignment pins 16.

In this way the mask/film sandwich 18 is first sucked down to the pin board 10 surface at the location of the alignment pins 16, an effect which seems to substantially increase the accuracy of relative alignment between the mask and the photographic film.

To help speed the evacuation of air from the vicinity of the mask/film sandwich 18, the top surfaces 24 of both the pin board and the vacuum port board 12 are textured with a pebble finish. As long as the top surface of both the pin and vacuum port boards 10, 12 are suitably textured, it is not essential that the manifold grooves 22, 22' be cut. However, the grooves 22, 22' are part of the preferred embodiment because experiments show that they significantly reduce the time required for the necessary level of evacuation before the light exposure.

As air is drawn from the interior of the vacuum frame through the exhaust port hole 20 of the vacuum port board 12, the gasket sheet 14 is sucked into intimate contact with the glass plate of the vacuum frame which covers the assembly illustrated by FIG. 1. As the gasket sheet 14 is drawn up around the pin board 10 and vacuum port board 12, these boards sink into the gasket sheet 14, leaving a depression 26 in the gasket sheet 14. When the gasket sheet 14 is in full contact with the glass plate it forms a complete and separate vacuum chamber within the larger chamber of the vacuum frame.

Thus, the pressure within the vacuum frame, outside the assembly of the preferred embodiment, may be somewhat higher than the pressure inside the inner chamber, which is created by the gasket sheet 14. It is evident that, when this is the case, not as much air will have been drawn from the interior of the vacuum frame as would be the case where more conventional pin board systems are used. This is one of the reasons that experiments have demonstrated a substantially reduced vacuum draw down time when the improved pin board system is used in an existing vacuum frame.

It is evident that, since the vacuum port board 12 lies entirely within the region of the gasket sheet 14, there must be some means of connecting the vacuum port hole 20 in the vacuum port board 12 with the vacuum outlet of the vacuum frame. This requirement can be fulfilled by cutting a suitably sized hole in the gasket sheet 14 so that air may be passed from the top surface of the vacuum port board 12 to the bottom surface of the gasket sheet 14 and subsequently out through the vacuum outlet of the vacuum frame.

Experiments with various materials for the gasket sheet 14 have shown that neoprene foam core synthetic rubber performs excellently. This material is most commonly used as "wet suit" fabric. The top, or gasket, surface of the neoprene sheet should be a thin covering membrane of impermeable material such as rubber—although a porous surface would also work, provided the pores are small enough, or the pore walls are thin enough, so that the pores can be squeezed shut when the chamber is evacuated.

The process of adaptively forming an inner chamber with this gasket sheet works so well, in fact, that for pin boards up to 20 by 24 inches in size, there really is no need for the usual vacuum frame assembly. The usual vacuum frame consists of a steel framed box with a rubber blanket for the floor and a glass plate for the top. A bead of gasket material is usually permanently attached around the edge of the blanket to provide a vacuum seal against the glass top plate.

Below the blanket, a rigid board is normally used as a mechanical support for the blanket when the interior of the vacuum frame is at ambient pressure. In practice the mask/film sandwich, together with a pin board, if one is used, is laid on top of the blanket before exposure to a light source. When the air is evacuated from inside this chamber, the blanket is sucked up off the support board and pushed up towards the glass plate. By this means, the blanket, in turn, presses the mask/film sandwich tightly against the glass plate.

With the new pin board assembly of this invention, the gasket sheet serves quite nicely for small vacuum frames in place of the traditional blanket and gasket bead. The requirements that must be met are that the gasket sheet be thick and compressible enough, and with a top surface resting high enough above the support board structure, that when the glass plate of the frame is brought down, it presses the pin and vacuum port boards into the gasket sheet and makes at least rough contact with the gasket sheet all around the free edges of the pin board and vacuum port board. Also, there must be a suitable hole cut through the gasket sheet so that there is an air passage from the top of the vacuum port board to the vacuum exhaust line which will be mounted below the gasket sheet. In most practical arrangements the vacuum line will pass through the hole in the gasket sheet and make direct connection with the vacuum port board.

With larger frames, and pin board assemblies, there is an advantage to retaining the traditional vacuum blanket, since this blanket lifts the improved pin board assembly up against the glass plate and insures that the gasket sheet makes good contact all around its periphery.

Figure 2:
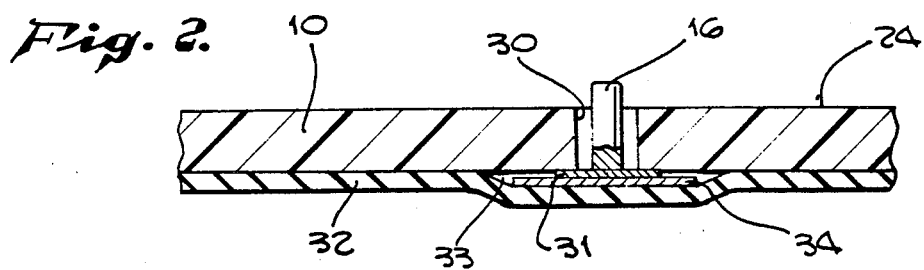
FIG. 2 shows a cross sectional view through the pin board at the location of one of the retracting pins.

In FIG. 2, a cross section through the preferred embodiment of the pin board 10 is illustrated. The figure shows the pin board 10, which may be constructed of a sheet of plastic that is typically from 1/32 to 1/16 inches thick. Plastic of this thickness is stiff enough to provide firm support for the mask/film sandwich 18, which will be mounted on the pin board, but it is also flexible enough to yield and flex when the vacuum frame blanket is pushed up against the bottom of the pin board assembly. By this yielding, the effects of the progressive squeezing action of sequentially inflating bladders, described in U.S. Pat. No. 4,505,142, may be effectively transmitted to the mask/film sandwich 18. Alternatively, a thinner, metallic "board" may be used so long as its firmness and flexibility are comparable.

Drilled into the pin board 10 are openings 30 within which float the alignment pins 16. In one embodiment the openings are substantially larger than the diameter of the cylindrical part of the pins 16 so that the pins can move laterally through enough of a distance to ensure that the mask and film can be properly aligned. Fastened to the bottom of the pin board 10, usually with an adhesive compound, is an elastic backing sheet 32. Experiments show that gum rubber is an excellent material for this backing sheet. The elastic sheet 32 may be attached to the pin board 10 over its entire bottom except for the region in the immediate vicinity of the pin hole openings 30. In these local regions, there should be no adhesion for a distance which is far enough from the pin holes 30 to allow the alignment pins 16 their full lateral motion.

When an alignment pin 16 is properly seated in its opening 30, the flat capping plate 31 of the pin 16 will project below the pin board bottom far enough to slightly stretch the elastic backing material 32. This forms a pocket 33 in the immediate vicinity of the alignment pin 16. As shown, a backing plate 34, which is larger than the capping plate 31, is positioned below the capping plate 31 in the pocket 33. The backing plate 34 assists in maintaining the pin 16 in an upright position and permits a more uniform application of the upward force imparted by the elastic backing material 32.

In alternative embodiments, the opening 30 may be a slot or some other shape that permits limited motion of the pin 16 while still being smaller than the capping plate 31. Yet other embodiments may include at least one opening which is substantially the diameter of the pin 16 so as to provide a fixed spatial reference point for the mask/film sandwich 44.

Figure 3:
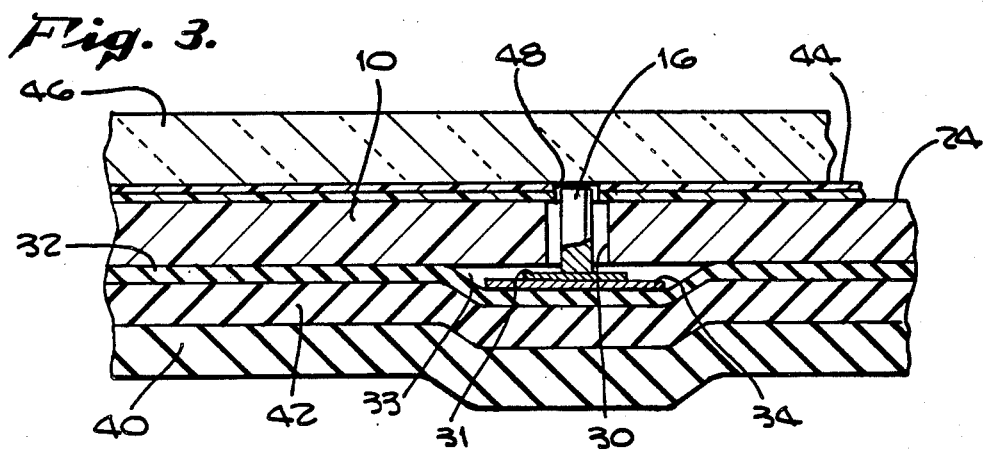
FIG. 3 is a similar cross sectional view of the pin board as it would be mounted in an evacuated vacuum frame.

FIG. 3 provides a cross sectional view through the vacuum frame and the pin board assembly 10 when the frame is fully evacuated. When the vacuum frame is evacuated, the pressure of the outside air presses upward on the frame blanket 40, which, in turn, presses the gasket sheet 42 upward and causes a force to be transmitted to the bottom of the pin board 10 sub assembly.

The force is transmitted to the pin board 10 through the intervening elastic backing material 32 and the backing plate 34. The pin board 10, in its turn, presses the mask/film sandwich 44 up against the glass cover plate 46 of the vacuum frame.

With the pin board 10 assembly and mask/film sandwich 44, pressed firmly against the glass plate 46, the alignment pin 16 is pushed downward against the backing plate 34, expanding the pocket 33 created in the elastic backing sheet 32, and also slightly buckling the gasket sheet 42 and the vacuum blanket 40 in the region immediately below the pin 16. In this arrangement, the cylindrical portion of the alignment pin 16 passes up through holes 48 punched in the mask and in the film, so that the top surface of the pin 16 rests flush against the bottom surface of the glass cover plate 46.

In the preferred embodiment of the invention, the pin board 10 is separated from the vacuum port board 12 so that the pin board 10 may be removed from the vacuum frame to a separate location for mounting and unmounting of the film and mask. In this embodiment the vacuum port board 12 may remain attached to the vacuum outlet of the vacuum frame. The attachment between the vacuum port board and the vacuum outlet can be any of a large variety of quick disconnect mechanisms. Since the port board primarily offers a convenience in communicating between the top surface of the pin board and the vacuum outlet, the tolerance in making this connection does not have to be very great.

In an alternative embodiment, the vacuum port is integrated with the pin board so that a single board can be used for the pin board assembly. The best arrangement is to have the pin board placed on the gasket sheet in such a way that the vacuum port hole is in reasonably good alignment with the vacuum communication hole cut in the gasket sheet material. To make this alignment easy to achieve, a shallow depression may be formed in the gasket sheet, into which the pin board is fitted when the pin board is placed in the vacuum frame.

In still another embodiment the pin board may be used by itself without the use of the gasket sheet or the vacuum port board.

Also, in yet another embodiment, the pin board may be completely rigid so that it does not flex when the vacuum blanket is pushed up against its bottom surface during evacuation of the vacuum frame.

A preferred embodiment, consisting in combination of a stiff, but flexible, pin board having floating alignment pins and an elastic backing sheet, a separate vacuum port board, and a sheet of gasket material, has been shown and described herein. It is obvious to anyone skilled in the art that this is not the only configuration which embodies the principles of the invention, and, therefore, numerous changes and additions may be made without departing from the spirit and scope of the invention.

For example, one pin can be held in a close tolerance opening while other pins are loosely held in openings that permit some freedom of movement. Further, while the invention has thus far been described in the context of a 2-hole alignment system, it is obvious that more than 2 holes can be employed. For example, systems are in use with 2 holes along one edge with a third hole at an opposite edge to prevent "tail wagging".

Accordingly, the invention should be limited only by the scope of the claims appended below.

What is claimed as new is:

1. Apparatus for use with a vacuum frame assembly for providing repeatable registration of a photomask and photosensitive plates, the combination comprising:
    (a) a substantially rigid pin board of limited flexibility having at least one aligning pin aperture for loosely containing an aligning pin;
    (b) at least one aligning pin having a body portion and a capping plate portion of greater surface area than the body portion cross sectional area, said body portion cross sectional area being smaller than said aligning pin aperture and said capping plate area being greater than said aligning pin aperture, said pin being located in said aligning pin aperture of said pin board; and
    (c) an elastomeric backing sheet for retaining said aligning pin in said pin aperture, said backing sheet extending over said capping plate and aperture and being fastened to said pin board surface near said aligning pin capping plate, whereby said aligning pin is loosely retained in said aperture by said backing sheet and is capable of axial as well as lateral motion.

2. Apparatus as in claim 1, above, further including a supporting plate attached to said elastomeric backing sheet adjacent said capping plate portion and in contact therewith to aid in positioning said aligning pin.

3. Apparatus as in claim 1, above wherein said pin board has, on the surface opposite that to which said elastomeric backing sheet is fastened, a texture sufficient to allow a flow of air between said surface and a photosensitive film member placed adjacent thereto.

4. Apparatus as in claim 1, above, wherein said pin board is sufficiently flexible to conform to motion of a pressure blanket during evacuation of air from the interior of the vacuum frame in which the apparatus is installed.

5. Apparatus as in claim 1, above, wherein said pin board is sufficiently inflexible to resist motion of a pressure blanket during evacuation of air from the interior of the vacuum frame in which the apparatus is installed.

6. The apparatus of claim 1, above, further including a vacuum port board adapted to be placed adjacent to said pin board, said vacuum port board including an aperture adapted to be in communication with the air evacuation system of the vacuum frame, said vacuum port board having a textured surface to facilitate the flow of air from said pin board surface to said vacuum port board aperture.

7. The apparatus of claim 6, above, further including a surface groove structure communicating with said vacuum port aperture to facilitate evacuation of air from the interior of the vacuum frame.

8. The apparatus of claim 1, above, further including a vacuum port in communication with said pin board for evacuating air from space overlying said pin board.

9. The apparatus of claim 8, above, wherein said pin board further includes on its surface, a texturing sufficient to permit a flow of air between said surface and an overlying photosensitive film to said vacuum port.

10. The apparatus of claim 1, above, further including gasket sheet means surrounding said pin board and further including means to provide fluid communication between said pin board and the exterior of said gasket sheet means.

11. The apparatus of claim 1, above, further including a second aligning pin substantially identical to said aligning pin positioned in a second aligning pin aperture in said pin board, said elastomeric backing sheet being fastened to said pin board surface near said second aligning pin capping plate, whereby said second aligning pin is also loosely retained in said second aperture by said backing sheet and is capable of axial as well as lateral motion.

12. The apparatus of claim 11, above, further including a second supporting plate attached to said elastomeric backing sheet adjacent said second aligning pin capping plate portion and in contact therewith to aid in positioning said second aligning pin.

13. A vacuum frame for bringing a photomask and a photosensitive film into intimate contact in repeatable registry comprising, in combination:
  (a) a rigid, transparent plate through which the photomask and film combination can be irradiated;
  (b) a substantially rigid pin board of limited flexibility having at least two aligning pin apertures for loosely containing aligning pins;
  (c) at least two aligning pins, each having a body portion and a capping plate portion of greater surface area than the body portion cross sectional area, said body portion cross sectional area being smaller than said aligning pin aperture and said capping plate area being greater than said aligning pin aperture, said pins being located in said aligning pin apertures of said pin board; and
  (d) an elastomeric backing sheet for retaining said aligning pins in said pin apertures, said backing sheet being fastened to said pin board surface near said aligning pin capping plates, for loosely capturing said aligning pins in said apertures with said backing sheet; whereby said aligning pins are loosely retained in said apertures by said backing sheet and are capable of axial as well as lateral motion.

14. The apparatus of claim 13, above, further including first and second supporting plates attached to said elastomeric backing sheet, each adjacent one of said aligning pin capping plate portions and in contact therewith to aid in positioning said aligning pins.

15. Apparatus as in claim 13, above wherein said pin board has, on the surface opposite that to which said elastomeric backing sheet is fastened, a texture sufficient to allow a flow of air between said surface and a photosensitive film member placed adjacent thereto.

16. Apparatus as in claim 13, above, wherein said pin board is sufficiently flexible to conform to motion of a pressure blanket during evacuation of air from the interior of the vacuum frame in which the apparatus is installed.

17. Apparatus as in claim 13, above, wherein said pin board is sufficiently inflexible to resist motion of a pressure blanket during evacuation of air from the interior of the vacuum frame in which the apparatus is installed.

18. The apparatus of claim 13, above, further including a vacuum port board adapted to be placed adjacent to said pin board, said vacuum port board including an aperture adapted to be in communication with the air evacuation system of the vacuum frame, said vacuum port board having a textured surface to facilitate the flow of air from said pin board surface to said vacuum port board aperture.

19. The apparatus of claim 18, above, further including a surface groove structure communicating with said vacuum port aperture to facilitate evacuation of air from the interior of the vacuum frame.

20. The apparatus of claim 13, above, further including a vacuum port in communication with said pin board for evacuating air from space overlying said pin board.

21. The apparatus of claim 20, above, wherein said pin board further includes on its surface, a texturing sufficient to permit a flow of air between said surface and an overlying photosensitive film to said vacuum port.

22. The apparatus of claim 13, above, further including gasket sheet means surrounding said pin board and further including means to provide fluid communication between said pin board and the exterior of said gasket sheet means.

* * * * *